United States Patent [19]

Rivier et al.

[11] 4,250,906
[45] Feb. 17, 1981

[54] FOLDING CARAVAN OF TENT CANVAS

[75] Inventors: Paul Rivier; Claude Bucari, both of Rumilly; Samuel Topalian, Eybens; Alain Baud, Echirolles, all of France

[73] Assignee: Andre Jamet, Grenoble, France

[21] Appl. No.: 7,925

[22] Filed: Jan. 30, 1979

[30] Foreign Application Priority Data

Apr. 20, 1978 [FR] France ................. 78 11678

[51] Int. Cl.³ .............. B60P 3/34; A45F 1/00
[52] U.S. Cl. .................. 135/1 A; 296/161; 296/168
[58] Field of Search .......... 135/1 A, 4 A, 4 R; 296/159–161, 168, 169

[56] References Cited

U.S. PATENT DOCUMENTS

| 3,489,452 | 1/1970 | Plante | 135/4 A X |
| 3,875,953 | 4/1975 | Couix | 135/1 A X |
| 3,917,337 | 11/1975 | Couix | 135/1 A X |
| 4,088,363 | 5/1978 | Palmer | 135/4 A X |

FOREIGN PATENT DOCUMENTS

| 1148043 | 12/1958 | Fed. Rep. of Germany | 135/4 R |
| 1076339 | 2/1960 | Fed. Rep. of Germany | 135/4 R |
| 2206211 | 6/1974 | France | |

Primary Examiner—J. Karl Bell
Attorney, Agent, or Firm—Young & Thompson

[57] ABSTRACT

A tent canvas which can be unfolded from a trailer after opening a hinged trailer cover is supported by a central ridge pole which is pivotally mounted on the trailer and by two roof-edge poles which are slidably mounted on the posts of the central ridge pole. A linking rod is pivotally connected at one end to each roof-edge pole and at the other end to the free end of the central ridge pole. The tent canvas is automatically unfolded and tensioned simply as a result of opening of the trailer cover without any need for tensioning cables.

7 Claims, 5 Drawing Figures

FOLDING CARAVAN OF TENT CANVAS

This invention relates to a folding caravan comprising a trailer containing a tent canvas which can be unfolded from the trailer after opening a cover which is hinged on one edge of the trailer.

In this type of folding caravan, the tent canvas is supported by a central ridge-pole pivotally mounted on one of the longtiudinal edges of the trailer and by two roof-edge poles pivotally attached to sliding mounted straps which are mounted on the posts of the central ridge pole. One side of the tent canvas is attached to the trailer along the edge opposite to the hinge of the trailer cover and the other side of the canvas is attached to the trailer cover along the edge opposite to said hinge.

In order to put said caravan in the service position, the trailer cover is swung back towards the ground, thus automatically causing unfolding of the canvas which is attached to said cover. In order to apply tension to the canvas, the roof-edge poles are displaced in sliding motion along the posts of the central ridge pole. This operation is laborious and calls in most cases for the use of cables actuated by a winch.

In one known arrangement, sliding of the roof-edge poles towards the free end of the central ridge pole is carried out automatically at the time of opening of the trailer cover by making use of tensioning cables which serve in particular to connect the roof-edge poles to the central ridge pole.

The use of cables of this type, however, gives rise to many difficulties. In fact, at the time of unfolding of the tent canvas, the cables are liable to catch on each other or on projecting portions of either the tent-poles or the trailer. This is in turn liable to result in tearing of the canvas or damage to the tent-poles in the event that the user should exert excessive pressure on the trailer cover.

The aim of the present invention is to overcome the above-mentioned disadvantages of known caravans by permitting automatic unfolding and tensioning of the tent canvas simply as a result of opening of the trailer cover without any need to make use of a cable for tensioning the canvas.

The folding caravan which is contemplated by the invention comprises a trailer containing a tent canvas which can be unfolded from said trailer after opening a cover which is hinged on one of the edges of the trailer, the tent canvas being supported by a central ridge pole which is pivotally mounted on the trailer and by two roof-edge poles which are slidably mounted on the posts of the main tent-pole.

In accordance with the invention, the caravan is distinguished by the fact that each roof-edge pole is connected to the central ridge pole by means of at least one linking rod, one of the ends of said rod being pivotally attached to the roof-edge pole and the other end being pivotally attached substantially to the free end of the central ridge pole.

At the time of unfolding of the tent canvas which is carried out by opening the trailer cover, the central ridge pole is brought to a substantially vertical position and the roof-edge poles fan-out from the central ridge pole. By virtue of the linking rods, the roof-edge poles are suspended from the central ridge pole, with the result that the roof-edge pole slide in the upward direction towards the ridge or central ridge pole while moving away from said central ridge pole. The tent canvas is thus automatically stretched simply under the action of the tractive force exerted by the trailer cover on the canvas as the cover is swung downwards to the ground.

The linking rods mentioned above are not liable to catch on projecting portions as was the case with the cables employed in known arrangements. Any danger of damage to the canvas and tent-poles is thus avoided.

In an advantageous embodiment of the invention, the caravan frame comprises two pairs of linking rods, the rods of each pair being pivotally attached substantially to the free ends of the posts of the central ridge pole and to the end arms of the roof-edge poles.

By virtue of this arrangement, the linking rods aforesaid permit efficient performance of the function explained in the foregoing. Furthermore, by virtue of this arrangement, the rods advantageously strengthen the side walls of the caravan which are adjacent to the tent-pole arms.

In a preferred embodiment of the invention, the sum of the length of the linking rods and the distance between the pin on which the rods are pivoted to the central ridge pole and the pins on which said rods are pivoted to the secondary tent-poles is substantially equal to the distance between the pin on which the rods are pivoted to the main tent-pole and the roof edge pole articulation when this latter is located at the end of travel in the proximity of the trailer.

Thus, when the roof-edge pole are folded against the main-tent pole and the complete set of tent-poles is folded inside the trailer, the linking rods extend in a direction which is substantially parallel to the arms of the different tent-poles, with the result that this assembly has a very small bulk when the tent is in the folded state.

Further distinctive features and advantages of the invention will become apparent from the following description, reference being made to the accompanying drawings which are given by way of example and not in any limiting sense, and wherein.

Figure 1:
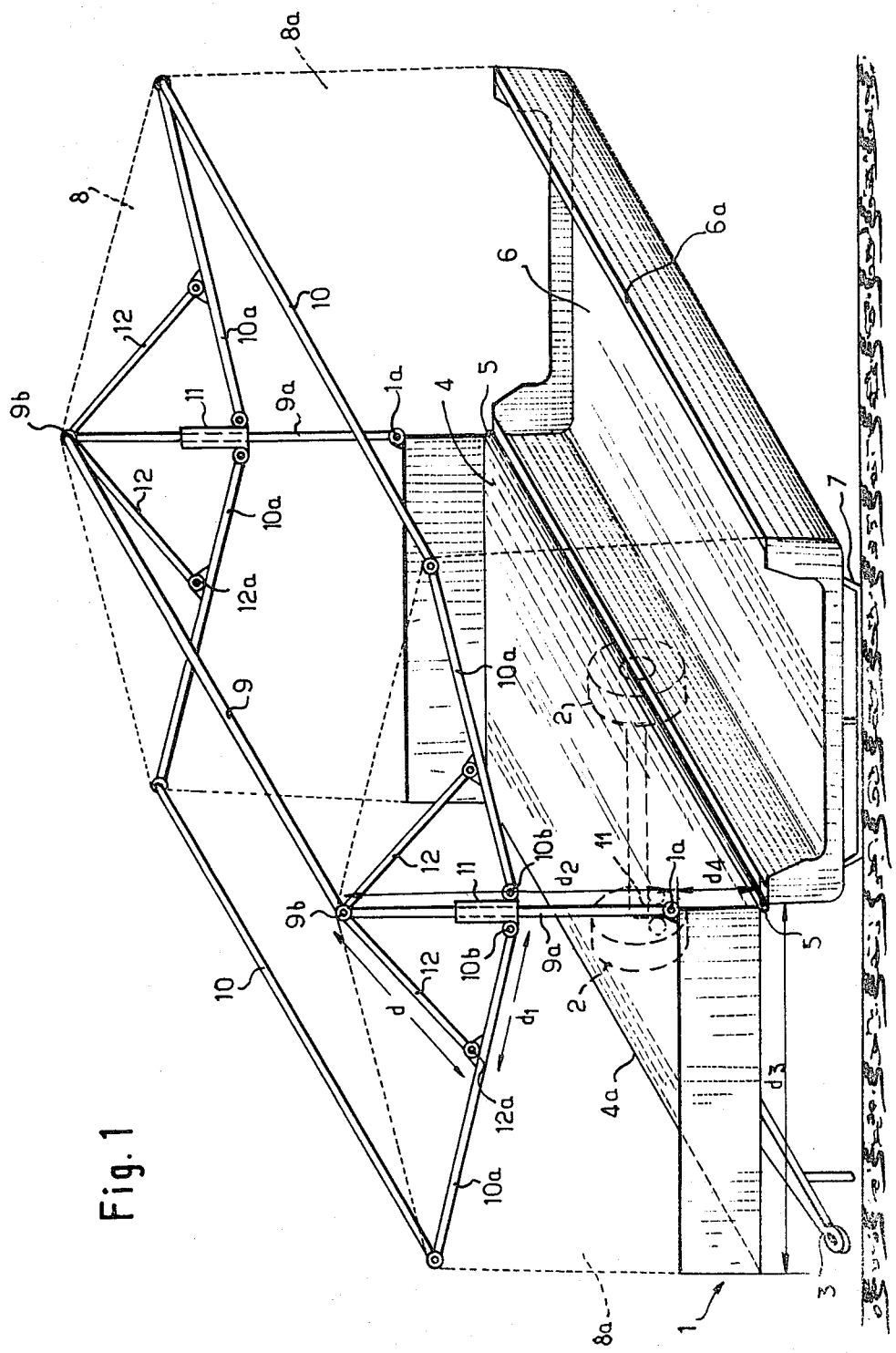
FIG. 1 is a perspective view of the caravan in accordance with the invention in the service position.

Referring first to FIG. 1, the caravan in accordance with the invention comprises a trailer 1 mounted on two wheels 2 and provided with a drawbar 3 for coupling the trailer. Said trailer 1 has a deck 4 and a cover 6 having the shape of a substantially parallelepipedal tray, said trailer cover being hinged on the longitudinal edge 5 of said deck.

In the service position as shown in FIG. 1, the trailer cover 6 is supported on the ground by means of bearing rails 7 which also serve as members for gripping the cover 6 when opening this latter.

The tent canvas 8 (shown in dashed lines) is supported by a central ridge-pole 9, the posts 9a of which are pivotally mounted at 1a on the top edge of the trailer above the hinge 5 of the trailer cover 6. The canvas 8 is also supported by two roof-edge poles 10 which are pivotally mounted on each side of central ridge sole 9 on sliding mounted straps 11 mounted on the posts 9a of said central ridge pole 9. The canvas 8 is attached to the edge 4a of the deck 4 and to the edge 6a of the trailer cover 6 which are remote from the hinge 5 of this latter.

The supporting framework provided for the canvas 8 also comprises two pairs of linking rods 12 which are pivotally attached to the free ends 9b of the posts 9a of the central ridge pole 9 and to the points 12a of the end arms 10a of the roof-edge poles 10. The roof-edge poles 10 are thus suspended from the central-ridge pole 9 by means of the linking rods 12.

In the example which is illustrated, the sum of the length d of the linking rods 12 and of the distance $d_1$ between the pin 10b on which each linking rod 12 is pivoted to the central ridge pole 9 and the pin 12a on which each rod is pivoted to each roof-edge pole 10 is substantially equal to the distance $d_2$ between the pin 9b on which the linking rods are pivoted to the central ridge pole 9 and each pin 10b on which each secondary tent-pole is pivotally mounted, when the mounted straps 11 are located at the end of travel in the proximity of the edge 1a of the trailer (see the position of the mounted straps 11 as shown in dashed lines in FIG. 1).

Furthermore, the length of each posts 9a of the central ridge pole 9 is substantially equal to the length of the end arm 10a of each roof-edge pole 10, said length being in turn slightly shorter than the width $d_3$ of the trailer 1.

It is further apparent from FIG. 1 that the side panels 8a of the tent canvas 8 located between the roof-edge pole 10 and the respective edges 4a and 6a of the trailer deck 4 and the trailer cover 6 are substantially perpendicular to the ground when the canvas 8 is in the unfolded state.

Moreover, the sum of the depth of the trailer cover 6, of the distance $d_4$ between the deck 4 of the trailer 1 and the articulation or pin 1a on which the central ridge pole 9 is pivoted to the top edge of the trailer, and of the length of each posts 9a of said main pole 9 is greater than the average height of a man.

Figure 2:
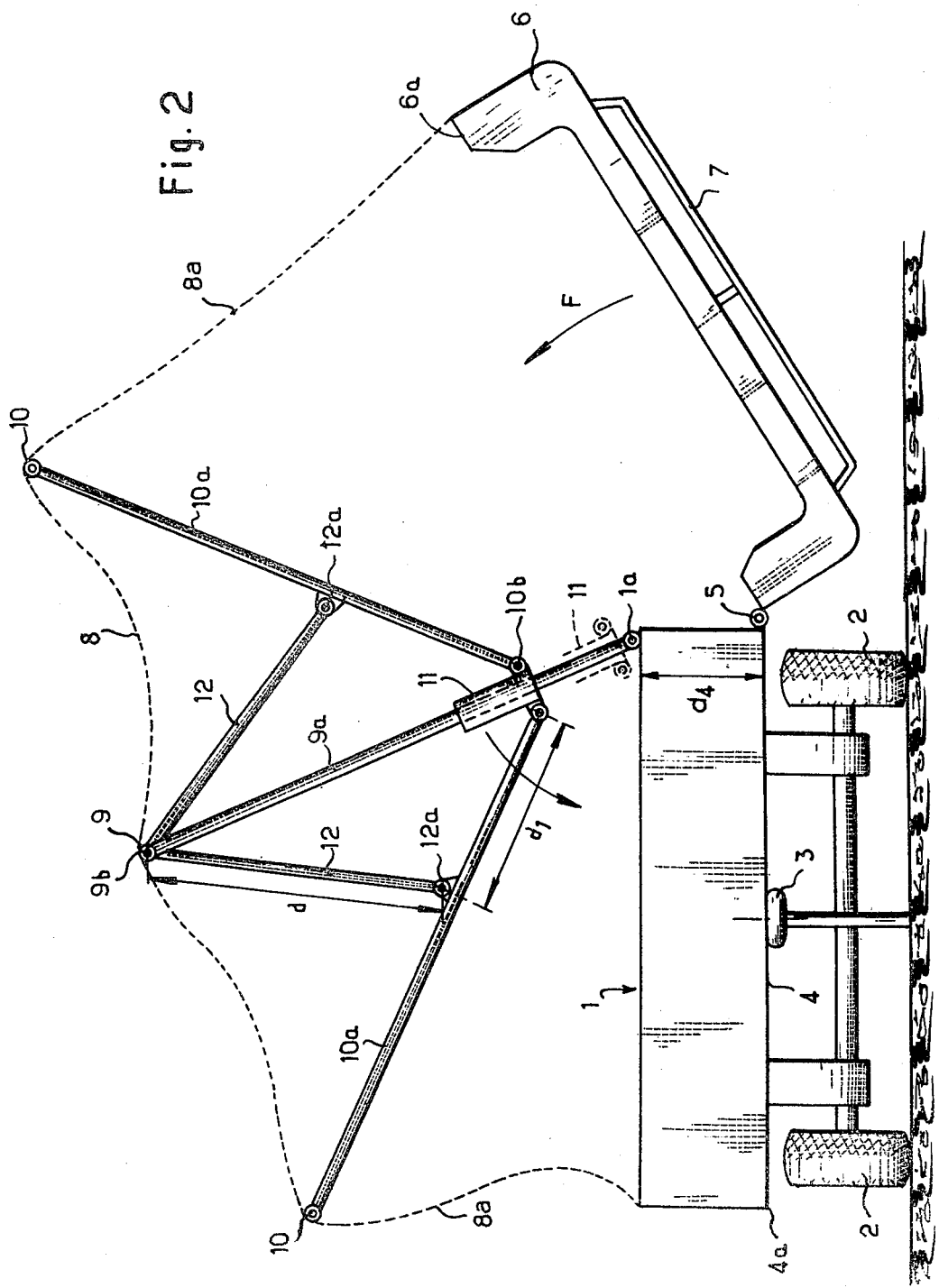
FIG. 2 is a front view of the caravan, the tent canvas being shown in a partially folded or unfolded state.

In order to fold-back the tent canvas 8 towards the trailer 1, the procedure is as follows (see FIG. 2):

The trailer cover 6 is lifted and swung back towards the trailer 1 about the pivot-pin 5 (as shown by the arrow F). This has the effect of relieving the tension applied to the canvas 8 between the points 4a and 6a at which said canvas is attached respectively to the trailer deck 4 and to the trailer cover 6.

In consequence, the weight of the tent canvas 8 which is applied on the framework produces the following simultaneous movements: swinging-back of the central ridge pole 9 to the trailer 1, sliding of the mounting straps 11 towards the pivot-pin 1a of the central ridge pole 9, folding-back of the roof-edge poles 10 and rods 12 towards the central ridge pole 9.

Figure 3:
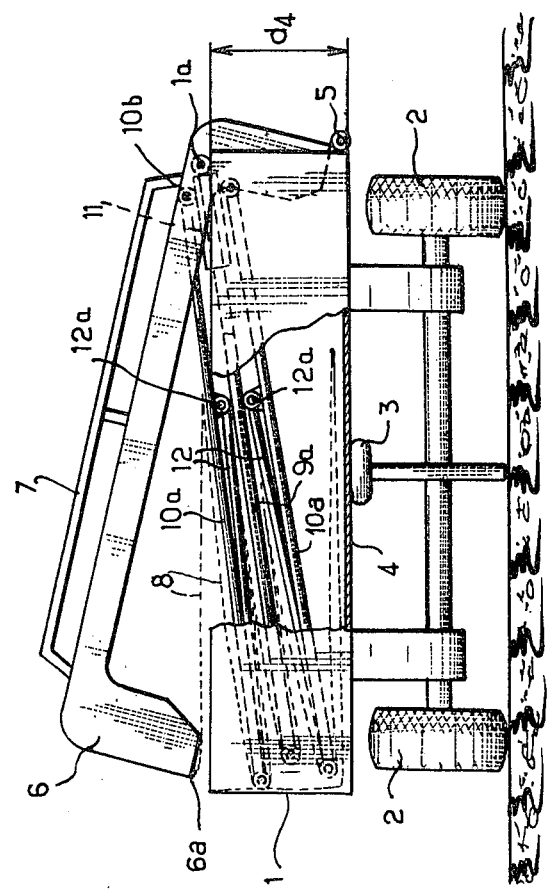
FIG. 3 is a view which is similar to FIG. 2 and in which the tent canvas is almost completely folded inside the trailer.

When the trailer cover 6 has been completely shut down on the trailer 1 (said cover being nearly closed in the position shown in FIG. 3), the roof-edge poles 10 and the linking rods 12 extend within the interior of the trailer in a direction parallel to and at a very short distance from each other whilst the tent canvas 8 is packed in the folded state beneath the tent-poles 9 and 10, between the poles and above these latter. The complete assembly has a very small bulk which fits very easily within the trailer 1.

Unfolding of the tent canvas 8 is carried out just as readily as folding-back.

To this end, it is only necessary to lift the trailer cover 6 and to swing this latter downwards to the ground. During this movement, the tent-poles 9 and 10 are displaced outwards. The roof-edge poles 10 undergo an upward sliding movement towards the ridge or central ridge pole 9 and fan-out from this latter by means of the linking rods 12 until they reach the position shown in FIG. 1.

If provision were not made for the linking rod 12, only partial unfolding of the tent canvas 8 would be obtained since the sliding mounting straps 11 could not slide upwards along the posts 9a to a sufficient height. In consequence, it would be necessary to thrust the mounted straps 11 upwards by hand or by means of a winch which produces action on cables in order to apply full tension to the canvas 8.

By virtue of the linking rods 12, the roof-edge poles 10 are automatically displaced upwards to a practically horizontal position. Taking into account the length of the poles 10, the side panels 8a of the canvas are therefore substantially perpendicular to the ground on completion of the unfolding operation, with the result that the habitability of the caravan is considerably improved.

Moreover and in accordance with the invention, the mere swinging motion of the trailer cover 6 in conjunction with the action of the linking rods 12 on the roof-edge poles 10 automatically causes unfolding of the canvas 8 and tensioning of this latter without any need to lock the sliding mounted straps 11 in the top position. Subsequent installation of various articles of furniture on the trailer cover 6 is then sufficient to forestall any danger of accidental folding-back of the tent canvas 8 towards the trailer 1 under the action of an external force such as wind, for example.

It should further be noted that the linking rods 12 make it possible to give a sufficient length to the tent-poles 9 and 10 to ensure that a man of average height can stand upright within the caravan over practically the entire internal surface of this latter including the deck 4 of the trailer 1.

The folding caravan in accordance with the invention is not only very convenient to unfold and foldback but its structure is also well suited to very functional interior accommodation and furnishing.

Figure 4:
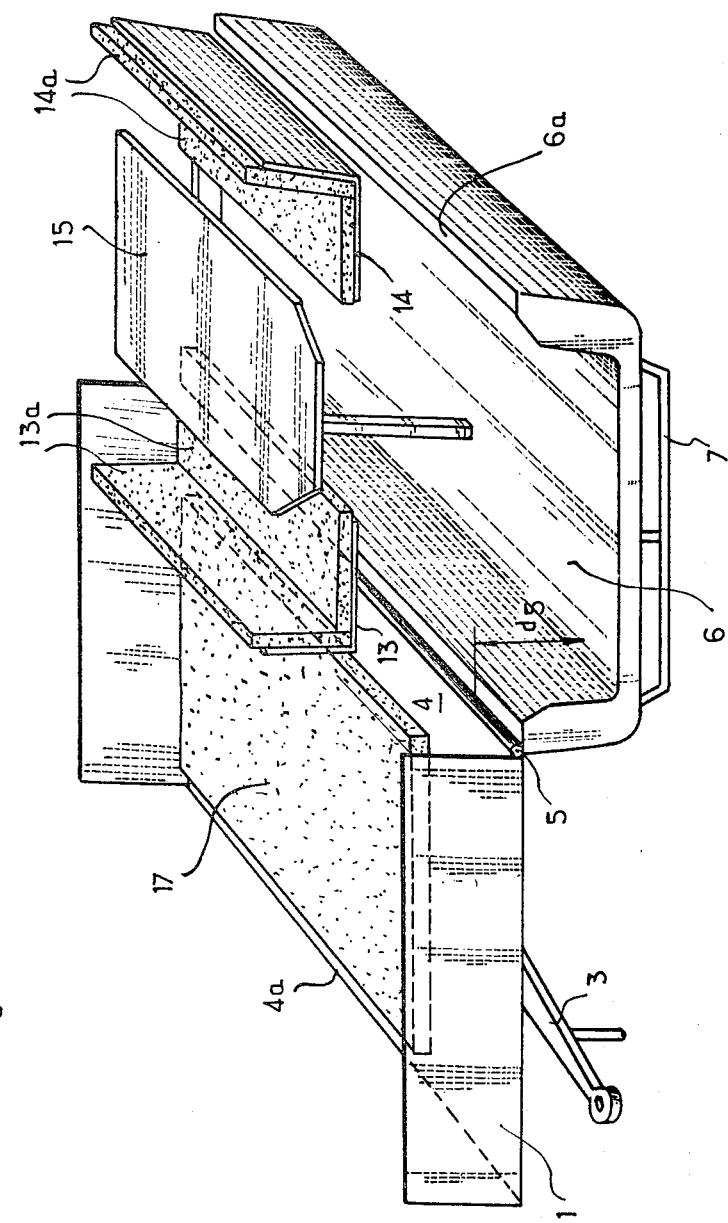
FIG. 4 is a perspective view of the caravan in accordance with the invention for use during the day, the tent canvas and the tent-poles having been removed.
Figure 5:
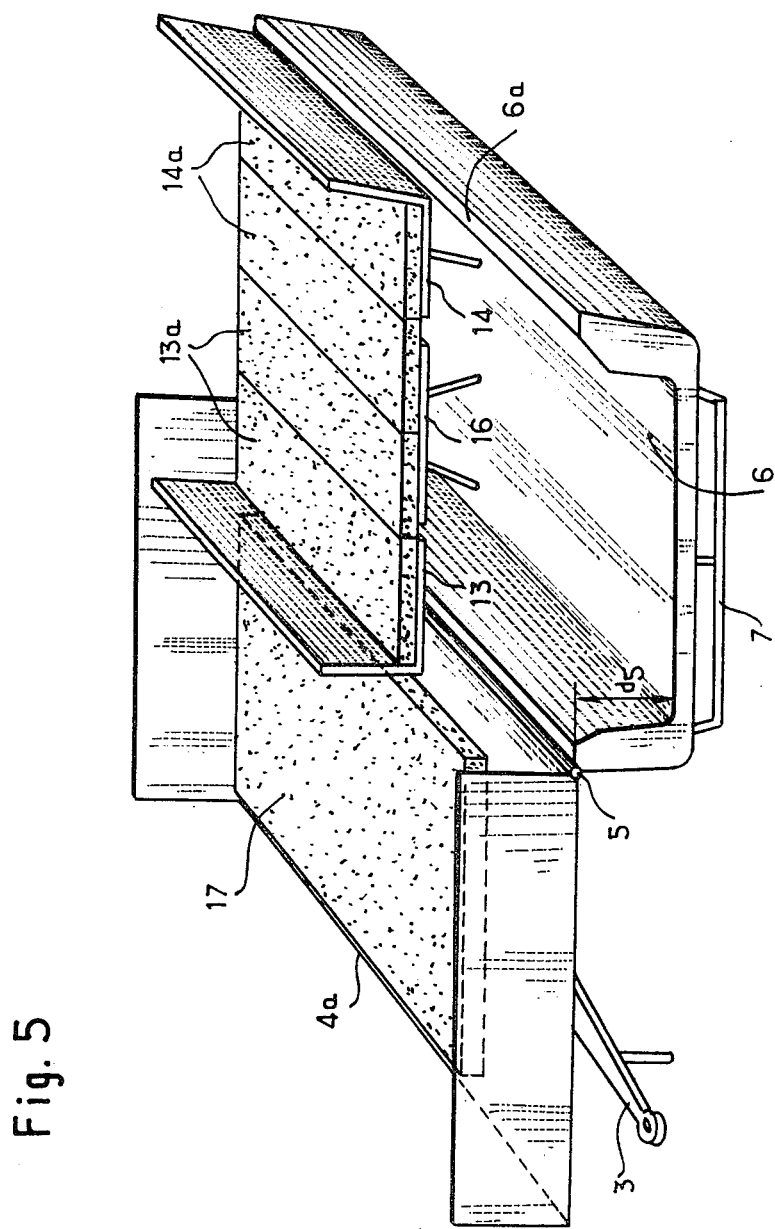
FIG. 5 is a view which is similar to FIG. 5 and shows the interior arrangement for use during the night.

Thus in the example shown in FIG. 4, the distance $d_5$ between the bottom of the trailer cover 6 and the deck 4 on which said cover is hinged corresponds to the height of a seat. Thus the portion of the deck 4 which is adjacent to the cover 6 is particularly well adapted to receive a seat 13 of the sofa type. In consequence, it is an advantage to place another seat 14 opposite to said seat 13 in proximity to the opposite edge 6a of the trailer cover whilst a table 15 is placed between the two seats 13 and 14. Said seats are fabricated from modular plates 13a and 14a of foam material and can readily be converted to a bed 16 for night use as shown in FIG. 5. For both day and night use, a foam mattress 17 can be placed lengthwise on the deck 4 of the trailer 1.

As can readily be understood, the invention is not limited to the examples hereinabove described and many modifications can accordingly be made in these latter without thereby departing either from the scope or the spirit of the invention.

From this it follows that one of the roof-edge poles 10 could be provided with telescopic end arms 10a in opposition to the action of a compression spring. This arrangement can facilitate folding-back of the tent canvas 8 and complete the tension of this latter in order to compensate either for manufacturing tolerances or for shrinkage of the canvas under the action of atmospheric humidity or for surface irregularities of the ground on which the trailer cover 6 rests.

Telescopic support members of the type just mentioned can be replaced by flexible arcuate arms.

As a further alternative, the end arms 10a of the roof-edge pole 10 which is located in the service position above the trailer cover 6 could be provided between its free end and the pivot-pin 12a of the rod 12 with a curvature haing a downwardly-directed concavity, thus providing sufficient clearance for the construction of an access door.

In another design, the two faces of canvas 8 which are located between the free end of the central ridge pole 9 and the free ends of the roof-edge poles 10 could be reinforced or replaced by removable and rigid panels which could be stored in the trailer 1.

In addition, the trailer cover 6 could be replaced by a simple platform hinged at the level of the edge of the trailer deck, thus making it possible to obtain a flat surface.

Finally, the trailer cover 6 or platform aforesaid could be hinged on one of the shorter sides corresponding to the width of the trailer.

I claim:

1. A folding caravan comprising a trailer containing a canvas tent which can be unfolded from said trailer after opening a cover which is hinged on one of the edges of the trailer, the tent being supported in unfolded position by a central ridge pole pivotally mounted on the trailer by means of posts and two roof-edge poles pivotally connected to the central ridge pole posts by arms whose opposite ends are mounted on members slidably mounted on the said posts, a point on the said arms being pivotally linked to the free end of the said posts by means of linking rods, in such a way that when opening the trailer cover, the posts are brought to a vertical position and the roof edge poles simultaneously fan out from the central ridge pole and the tent canvas is stretched only by the pulling force exerted by the trailer cover through the canvas on the system of slidable arms and linking rods.

2. A caravan according to claim 1, wherein the sum of the length of the rods and of the distance between the point at which the rods are pivoted to the main tent-pole and the point at which said rods are pivoted to the roof-edge poles is substantially equal to the distance between the point at which the rods are pivoted to the central ridge pole and the roof-edge pole articulation when said articulation is located at the end of travel in the proximity of the trailer.

3. A caravan according to claim 1 in which the central ridge pole is hinged substantially on the top edge of the trailer, wherein the length of each said post of the central ridge pole is substantially equal to the length of said arms length being slightly shorter than the width of the trailer.

4. A caravan according to claim 2, wherein the side panels of tent canvas located between the roof-edge poles and the opposite edges of the trailer and of the trailer cover are substantially perpendicular to the ground when the canvas is in the completely unfolded state.

5. A caravan according to claim 3, wherein the sum of the depth of the trailer cover, of the distance between the trailer deck and the point at which the central ridge pole is pivoted to the edge of said trailer and of the length of said central ridge pole exceeds the average height of a man.

6. A caravan according to claim 1 in which the trailer cover is hinged on the trailer substantially at the level of the trailer deck, said trailer cover being intended to form a substantially parallelepipedal tray, wherein the depth of said tray is substantially equal to the height of a seat.

7. A caravan according to claim 1, wherein the trailer cover is constituted by a platform which is hinged at the level of the trailer deck.

* * * * *